Patented Apr. 19, 1932

1,854,589

UNITED STATES PATENT OFFICE

FREDERICK G. KEYES, OF CAMBRIDGE, MASSACHUSETTS, ASSIGNOR, BY MESNE ASSIGNMENTS, TO FRIGIDAIRE CORPORATION, A CORPORATION OF DELAWARE

GAS OR LIQUID STORING MATERIAL

No Drawing. Original application filed June 8, 1921, Serial No. 475,855. Divided and this application filed September 6, 1922. Serial No. 586,550. Renewed May 26, 1930.

The present invention relates to improvements in gas or liquid storing materials useful in the arts generally, and particularly in refrigerating apparatus, one form of such an apparatus being shown in my application for patent for refrigeration filed June 8, 1921, Serial Number 475,855, of which this application is a division.

By way of example, the liquid or gas to be stored is referred to hereinafter as a "refrigerant," such as ammonia, which is commonly used in refrigerating apparatus although it is to be understood that my invention is not limited to the use of this particular fluid or to refrigerating apparatus.

The storing material in a still is an important element in a refrigerating apparatus and should preferably be a solid material capable of taking up the refrigerant and holding it in such a physical state as to maintain its vapor pressure below that of the free liquid. Several important factors enter into the production of a practical and highly efficient storing material to be used in a safe refrigerator apparatus, and the desirable properties or qualities of such a material are:

1. It must be stable at elevated temperatures;
2. It must not react under any conditions of use with the metal used to contain it;
3. The unit weight of the material must take up a large amount of refrigerant;
4. Its heat capacity must be as small as possible; and,
5. The speed with which it takes up the refrigerant must be large enough to produce effective and efficient refrigeration at the point from which it is drawing the refrigerant.

I have found that by special treatment of cellular material, such as charcoal, with certain metallic salts, for example, zinc chloride, chromic acid, etc., a substance is produced which I term "activated charcoal" and one well suited as a storing material for use in refrigerating apparatus. This material condenses the refrigerant on its surfaces, holding it with great tenacity at room temperature, and readily and completely giving it up at moderately elevated temperatures, 150° C.

The use of "activated charcoal" as a storing material in refrigerating machines, due to its large bulk per unit weight necessitates a large still which in turn offers a large surface for radiation involving a possible diminution in the efficiency of operation of the apparatus, as compared with the efficiencies obtainable when other materials are used. The great advantage, however, of an adsorbent such as charcoal is that it takes up the refrigerant with extreme rapidity and this is an advantage at the end of the distillation period when it is necessary to start the return of the refrigerant promptly from the refrigerating chamber. For example, one gram of charcoal in its optimum state of activity has a heat capacity of about .25 calories per gram. The maximum amount of ammonia, for example, which a certain sample will take up is, for example, 0.125 and the heat necessary to drive this off at 150° C. is about 75 calories. In heating to 150° C. therefore, about 38 calories are used up owing to the heat capacity of the absorbent material so that 26 per cent of the energy has been thrown away on heating the material. It is clear therefore that an increase in efficiency would be obtained if less heat were necessary to disengage the gas from the storing material and less heat were necessary to raise the material to the point where the refrigerant is given up. A variety of substances were considered as storing materials for refrigerating machines and calcium chloride settled upon as the most feasible material. Each gram of the last named substance takes up 1.22 grams of ammonia and the ammonia moreover enters into chemical combinations as stated in the formula $CaCl_2.8NH_3$. There are other calcium chloride compounds, one said to contain 4 molecules of ammonia, but the formula given corresponds to the maximum amount of ammonia and moreover possesses a very small pressure of ammonia at ordinary temperature. It was found in using this material alone that the rate at which it would take up ammonia was very small due to a tendency to pulverize and to pack, thus preventing ready access of the refrigerant.

It becomes, therefore, a problem of discovering the best physical state and mode of preparation of this material so as to maintain it in the still under the conditions of operation in such a state that it would expose the maximum surface and remain in a friable, porous condition offering no resistance to the free circulation of the refrigerant. It was found that Portland cement mixed with the chloride to the amount of 10 to 15 per cent and sufficient water to form a thick paste could be slowly baked in the presence of ammonia so as to give a material in hard porous grains which maintained their form under repeated heating and cooling in the distilling and taking up of the ammonia. This material, however, while serviceable may develop a tendency, due to its composition, to dehydrate, when operated at extremely elevated temperatures.

It has been known for a long time that zinc chloride forms with zinc oxide certain oxychlorides which are in effect hard cement and it is a fact of common observation that sodium silicate will, upon heating, blow up to a porous, spongy mass. I make use of the above mentioned characteristics of these substances to produce a hard porous storing material for refrigerant gases and liquids having a large taking up capacity together with a high rate of taking up, the physical structure being such as to persist and withstand the disintegrating action of rapid heating and cooling and changes of volume produced by taking up and disengaging refrigerant, as follows:

Dry calcium chloride is mixed with 10 per cent of molecular proportions dry zinc oxide (ZnO) and zinc chloride ($ZnCl_2$). After thorough incorporation in a ball mill it is then moistened with sodium silicate (in sufficient amount that there will be 3 per cent of sodium silicate in the mixture when dry) and the pasty mass dried in a current of ammonia at about 250° C. The material is then broken up and sifted and then reheated at 500° to 600° C. in the presence of ammonia, whereupon an extremely porous, hard material is obtained which possesses the quality of taking up ammonia with great rapidity, and, moreover, one which does not decompose on heating to a high temperature (700–750° C.).

When either one of the calcium chloride mixtures is used alone as the storing material, due to the fact that it is of small bulk and possesses the property of rapidly taking up a large amount of refrigerant per unit weight when cooled and readily giving it up when heated to a temperature of about 150° C., a smaller containing still is used in the apparatus than when activated charcoal alone is used as the storing material therein, and the radiation losses at the still of the apparatus are therefore minimized. In fact, I have found by mixing approximately equal volumes of activated charcoal and one or the other of the above mentioned calcium chloride mixtures in a small still, the charcoal serving to support and to maintain even distribution of the chloride mixture throughout the still and aiding to promptly start the refrigerating period due to the extreme speed with which it takes up the refrigerant, that highly efficient operation of the apparatus is obtained.

What I claim is—

1. A hard porous storing material for gases and liquids comprising calcium chloride qualified by zinc oxychloride.

2. A hard porous storing material for gases and liquids comprising calcium chloride, sodium silicate, and a cementitious substance, and activated charcoal mixed therewith.

3. An absorbing agent for a refrigerant in an absorption refrigerating apparatus, said absorbing agent having the property of repeatedly absorbing and giving up the refrigerant without substantially changing its physical characteristics, said agent consisting of a solid material remaining solid throughout the operating temperature range of the system, the particles of the solid material being held together by a binding material to withstand changes in volume incident to the absorbing and giving up of the refrigerant gas.

4. An absorbing agent for refrigerant in an absorption refrigerating apparatus, said absorbing agent having the property of repeatedly absorbing and giving up the refrigerant without changing its physical characteristics, said agent consisting of a powdered solid material remaining solid throughout the operating temperature range of the system, the individual particles of the powder being held together by a binding material to withstand changes in volume incident to the absorbing and giving up of the refrigerant gas.

5. An absorbing agent for refrigerant in an absorption refrigerating apparatus, said absorbing agent having the property of repeatedly absorbing and giving up the refrigerant without substantially changing its physical characteristics, said agent consisting of a powdered solid material remaining solid throughout the operating temperature range of the system, the individual particles of the powder being held together in discrete granules by a binding material to withstand changes in volume incident to the absorbing and giving up of the refrigerant gas.

6. An absorbing agent for refrigerant in an absorption refrigerating apparatus, said absorbing agent having the property of repeatedly absorbing and giving up the refrigerant without substantially changing its physical characteristics, said agent consisting of a powdered solid material remaining solid throughout the operating temperature range of the system, the individual particles of the powder being held together in discrete granules by a permanent hard cement to withstand changes in volume incident to the absorbing and giving up of the refrigerant gas.

7. An absorbing agent for refrigerant in an absorption refrigerating apparatus, said absorbing agent having the property of repeatedly absorbing and giving up refrigerant without substantially changing its physical characteristics, said agent consisting of a solid material having the property of entering into chemical combination with the refrigerant and remaining solid throughout the operating temperature range of the system, the particles of the solid being held together by a binding material to withstand changes in volume incident to the absorbing and giving up of the refrigerant gas.

In testimony whereof I hereto affix my signature.

FREDERICK G. KEYES.